(12) United States Patent
Hattori et al.

(10) Patent No.: US 7,378,029 B2
(45) Date of Patent: May 27, 2008

(54) METHOD FOR MANUFACTURING MAGNETIC RECORDING MEDIUM

(75) Inventors: Kazuhiro Hattori, Tokyo (JP); Shuichi Okawa, Tokyo (JP); Takahiro Suwa, Tokyo (JP); Mikiharu Hibi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/059,487

(22) Filed: Feb. 17, 2005

(65) Prior Publication Data

US 2005/0186357 A1 Aug. 25, 2005

(30) Foreign Application Priority Data

Feb. 23, 2004 (JP) ............... 2004-046926

(51) Int. Cl.
*G11B 3/70* (2006.01)

(52) U.S. Cl. ............... 216/22; 216/38; 216/66

(58) Field of Classification Search ............... None
See application file for complete search history.

(56) References Cited

U.S. PATENT DOCUMENTS

| 4,614,563 | A | | 9/1986 | Kubo | |
|---|---|---|---|---|---|
| 4,676,868 | A | | 6/1987 | Riley et al. | |
| 4,703,383 | A | * | 10/1987 | Katou et al. | 360/126 |
| 4,935,278 | A | * | 6/1990 | Krounbi et al. | 428/848.5 |
| 5,276,959 | A | * | 1/1994 | Yamamoto | 29/603.21 |
| 5,748,421 | A | * | 5/1998 | Taki et al. | 360/135 |
| 6,014,296 | A | | 1/2000 | Ichihara et al. | |
| 6,168,845 | B1 | * | 1/2001 | Fontana et al. | 428/836 |
| 6,379,570 | B1 | * | 4/2002 | Fatula et al. | 216/22 |
| 6,565,763 | B1 | * | 5/2003 | Asakawa et al. | 216/56 |
| 6,602,620 | B1 | * | 8/2003 | Kikitsu et al. | 428/842.2 |
| 6,764,738 | B1 | * | 7/2004 | Wu et al. | 428/831.2 |
| 6,780,531 | B2 | * | 8/2004 | Tani et al. | 428/840.3 |
| 6,824,835 | B2 | * | 11/2004 | Noguchi et al. | 427/547 |
| 2001/0006042 | A1 | * | 7/2001 | Iijima et al. | 118/718 |
| 2002/0034665 | A1 | * | 3/2002 | Nakazawa et al. | 428/694 TS |
| 2002/0088947 | A1 | * | 7/2002 | Moran | 250/492.3 |
| 2002/0097640 | A1 | * | 7/2002 | Seo et al. | 369/13.24 |
| 2002/0148941 | A1 | * | 10/2002 | Sorokov et al. | 249/114.1 |
| 2003/0021908 | A1 | * | 1/2003 | Nickel et al. | 427/551 |

(Continued)

FOREIGN PATENT DOCUMENTS

JP A-56-58247 5/1981

(Continued)

*Primary Examiner*—Allan Olsen
(74) *Attorney, Agent, or Firm*—Oliff & Berridge, PLC

(57) ABSTRACT

A method for manufacturing a magnetic recording medium is provided, by which a magnetic recording medium having a recording layer formed in a concavo-convex pattern, a sufficiently flat surface, and high recording and reproducing precision is efficiently manufactured. In a non-magnetic material filling step, a non-magnetic material is deposited over a recording layer formed in a predetermined concavo-convex pattern over a substrate to fill concave portions of the concavo-convex pattern with the non-magnetic material. In a flattening step, an excess part of the non-magnetic material above the recording layer is removed by dry etching, to flatten surfaces of the recording layer and the non-magnetic material. Processing conditions are set so as to substantially equalize an etching rate of the non-magnetic material with an etching rate of the recording layer with respect to the dry etching in the flattening step.

2 Claims, 6 Drawing Sheets

U.S. PATENT DOCUMENTS

| | | |
|---|---|---|
| 2003/0112560 A1* | 6/2003 | Takeshita et al. ............ 360/135 |
| 2003/0162344 A1* | 8/2003 | Ishii et al. ................... 438/200 |
| 2004/0071951 A1* | 4/2004 | Jin .............................. 428/323 |
| 2004/0080871 A1* | 4/2004 | Usa et al. .................... 360/135 |
| 2004/0108067 A1* | 6/2004 | Fischione et al. ...... 156/345.38 |
| 2004/0110037 A1* | 6/2004 | Kuse et al. ........... 428/694 BN |
| 2004/0160700 A1* | 8/2004 | Kagami et al. .............. 360/244 |
| 2004/0166372 A1* | 8/2004 | Haginoya et al. ........ 428/694 T |
| 2005/0079282 A1* | 4/2005 | Jin .......................... 427/126.6 |
| 2005/0086795 A1* | 4/2005 | Suwa et al. .............. 29/603.01 |
| 2005/0105325 A1* | 5/2005 | Haneda et al. ............... 365/154 |
| 2005/0118533 A1* | 6/2005 | Mirkarimi et al. .......... 430/316 |
| 2005/0181239 A1* | 8/2005 | Ma et al. ..................... 428/835 |
| 2005/0196606 A1* | 9/2005 | Ihara et al. ................. 428/323 |

FOREIGN PATENT DOCUMENTS

| | | |
|---|---|---|
| JP | A-57-50436 | 3/1982 |
| JP | A-61/227183 | 10/1986 |
| JP | 61-289635 | 12/1986 |
| JP | A-6-162448 | 6/1994 |
| JP | 09-097419 | 4/1997 |
| JP | 09097419 A * | 4/1997 |

* cited by examiner

METHOD FOR MANUFACTURING MAGNETIC RECORDING MEDIUM

BACKGROUND OF THE INVENTION

1. Field of the Invention

The present invention relates to a method for manufacturing a magnetic recording medium in which a recording layer is formed in a concavo-convex pattern.

2. Description of the Related Art

Conventionally, a magnetic recording medium such as a hard disc has been significantly increased in areal density because of improvement such as fining magnetic particles composing a recording layer, material change, and increased precision in the processing of magnetic heads. Further increase in the areal density is expected in the future.

However, problems such as processing limits of magnetic head, side fringes due to the spread of a magnetic field, and crosstalk have become revealed, so that increase in the areal density by a conventional improvement method has reached its limitation. Thus, the so-called patterned medium type of magnetic recording medium such as a discrete track medium and a discrete bit medium has been proposed as a candidate for a magnetic recording medium which can realize the further increase in the areal density (refer to, for example, Japanese Patent Laid-Open Publication No. Hei 9-97419). In such a magnetic recording medium, a recording layer is formed in a concavo-convex pattern.

When the surface of the medium includes the concavo-convex pattern, on the other hand, there are cases where recording and reproducing characteristics become worse because the flying height of a head slider is unstable. Accordingly, it is necessary to deposit a non-magnetic material over the recording layer in the concavo-convex pattern for the purpose of filling concave portions with the non-magnetic material. Then, the excess part of the non-magnetic material above the recording layer has to be removed to flatten its surface.

A method of dry etching is available as a method for processing the recording layer into the concavo-convex pattern. A deposit technology such as sputtering, which is used in the field of semiconductor manufacturing, is available as a method for depositing the non-magnetic material. Also, a processing technology such as CMP (chemical mechanical polishing), which is used in the field of semiconductor manufacturing, is available as a method for removing the excess part of the non-magnetic material above the recording layer to flatten the surface.

In the CMP method, however, it is difficult to precisely control the amount of processing (thickness) in the order of 1 to 2 nm. Thus, there are cases where after the non-magnetic material above the recording layer is removed, a part of the recording layer is removed together with the non-magnetic material, and hence difference in the height of the surface contrarily increases because of difference between the processing rates of both.

The CMP method is a wet process. Accordingly, there is a problem that combining the CMP method and a dry process such as a processing process of the recording layer makes it complicated to convey an object to be processed and the like, so that the efficiency of the whole manufacturing process becomes worse.

When the CMP method is used, there is also a problem that slurry reacts with the recording layer and the magnetic characteristic of the recording layer tends to be degraded. Furthermore, there is a problem that using the CMP method takes much time and cost for cleaning and the like, because the slurry has to be removed.

SUMMARY OF THE INVENTION

In view of the foregoing problems, various exemplary embodiments of this invention provide a method for efficiently manufacturing a magnetic recording medium, which has a recording layer formed in a concavo-convex pattern, and a sufficiently flat surface to realize high recording and reproducing precision.

To solve the foregoing problems, the present invention uses dry etching in a flattening step. Also, an etching condition is set so as to substantially equalize an etching rate of a non-magnetic material with an etching rate of a recording layer with respect to the dry etching. The dry etching tends to selectively remove a protruding portion of a deposit quicker than the other portions, so that it is possible to realize a high flattening effect. Also, the dry etching can easily control the amount of processing than a CMP method. Furthermore, the etching rate of the non-magnetic material is substantially set to be equal to the etching rate of the recording layer. If a part of the recording layer is removed together with the non-magnetic material after the non-magnetic material above the recording layer is completely removed, it is possible to prevent increase in difference in the height between the top face of the recording layer and the top face of the non-magnetic material.

Accordingly, various exemplary embodiments of the present invention provide a method for manufacturing a magnetic recording medium comprising:

a non-magnetic material filling step of depositing a non-magnetic material over a recording layer formed in a predetermined concavo-convex pattern over a substrate to fill a concave portion of the concavo-convex pattern with the non-magnetic material; and a flattening step of removing an excess part of the non-magnetic material above the recording layer by dry etching to flatten surfaces of the recording layer and the non-magnetic material, wherein a processing condition is set so as to substantially equalize an etching rate of the non-magnetic material with an etching rate of the recording layer, with respect to the dry etching in the flattening step.

A "recording layer formed in a concavo-convex pattern" used herein means to include a recording layer divided into a plurality of recording elements, a recording layer which is partly divided so as to continue a part thereof, a recording layer formed continuously to a part over a substrate like a recording layer in a spiral shape, and a continuous recording layer in which both of a convex portion and a concave portion are formed.

The term "an excess part of the non-magnetic material" used herein means a non-magnetic material existing above the top face of the recording layer (on the opposite side of the substrate).

The term "etching rate" used herein means an amount of processing by etching per unit time.

The phrase of "the etching rate of the non-magnetic material is substantially equal to the etching rate of the recording layer" used herein means a case where the difference between both of the etching rates converges to a minute range of, for example, 10% or less, and is not limited to a case where the difference between the etching rates is completely 0 (zero).

The term "ion beam etching" used herein means a generic name of a processing method such as ion milling, in which an ionized gas is applied to an object to be processed to remove a surplus material.

The term "incident angle of ion beam" means an angle at which an ion beam is incident upon the surface of an object to be processed, and an angle which the surface of the object to be processed forms with an average irradiation direction of the ion beam. For example, when the central axis of the ion beam is in parallel with the surface of the object to be processed, the incident angle is 0 degree. When the central axis of the ion beam is orthogonal to the surface of the object to be processed, the incident angle is +90 degrees.

The term "magnetic recording medium" used herein means to include a magneto optical recording medium such as an MO which uses both of magnetism and light, and a thermal assisted recording medium using both of magnetism and heat, in addition to a hard disc, a floppy disc (registered trademark), a magnetic tape, and the like which use only magnetism for recording and reading information.

According to the present invention, since the dry etching is used in the flattening step, it is possible to obtain a high flattening effect. Also, the etching condition is set so as to substantially equalize the etching rate of the non-magnetic material with the etching rate of the recording layer. Therefore, if a part of the recording layer is removed together with the non-magnetic material after the non-magnetic material above the recording layer is completely removed, it is possible to prevent increase in difference in the height between the top face of the recording layer and the top face of the non-magnetic material. Using the dry etching does not need cleaning of slurry and the like. Furthermore, combining the dry etching with another dry process makes it possible to increase efficiency in the whole manufacturing process.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
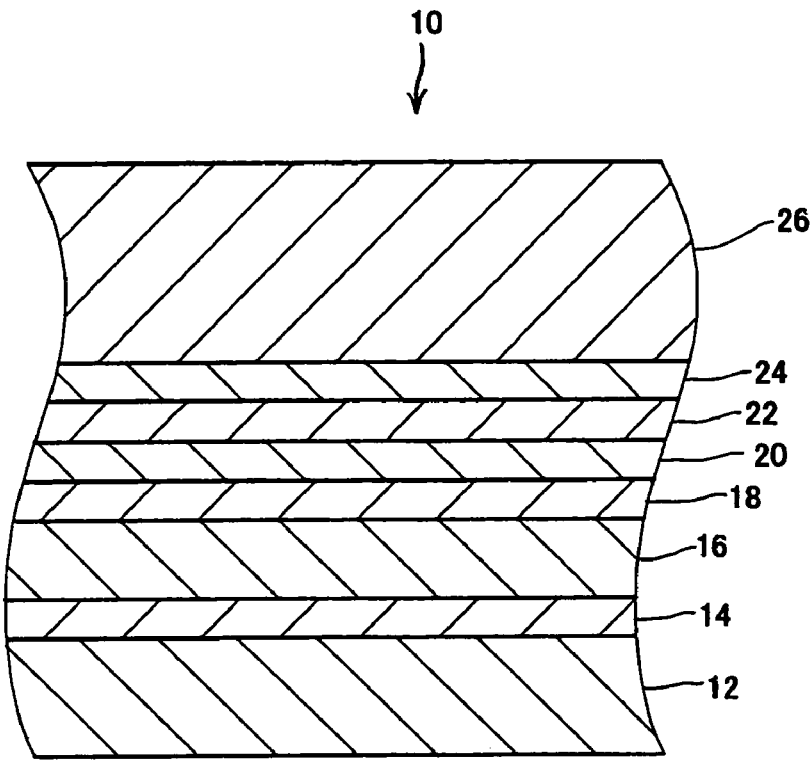
FIG. 1 is a schematic cross-sectional side view showing the configuration of a starting body of an object to be processed according to a first exemplary embodiment of the present invention.
Figure 2:
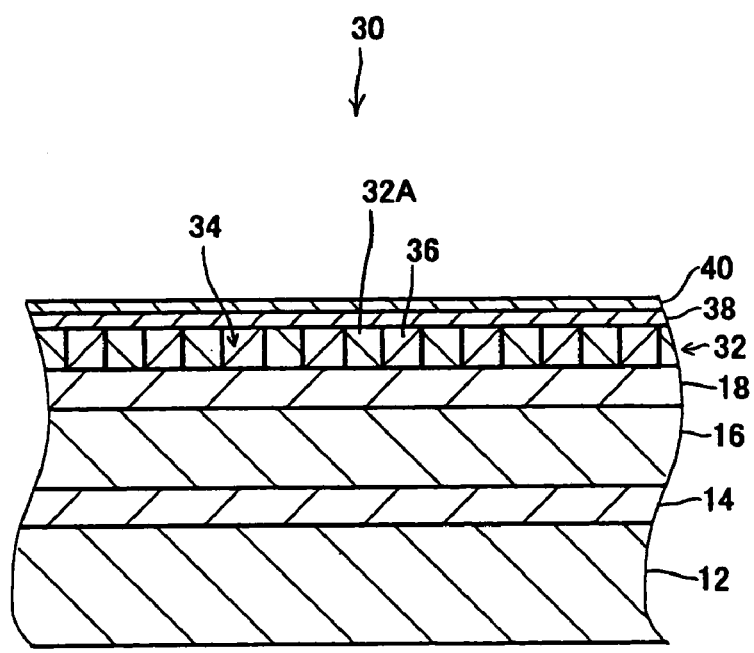
FIG. 2 is a schematic cross-sectional side view showing the configuration of a magnetic recording medium obtained by processing the object to be processed.

A first exemplary embodiment of the present invention relates to a method for manufacturing a magnetic recording medium. According to the first exemplary embodiment, a starting body of an object to be processed, in which a continuous recording layer is formed over a substrate as shown in FIG. 1, is subjected to processing, so as to divide the continuous recording layer into a number of recording elements in a predetermined concavo-convex pattern. Also, concave portions between the recording elements (concave portions in the concavo-convex pattern) are filled with a non-magnetic material to manufacture the magnetic recording medium as shown in FIG. 2. The first exemplary embodiment has characteristics in a non-magnetic material filling step and a flattening step. Since the other steps do not seem so important to understand this exemplary embodiment, the description thereof will be properly omitted.

Referring to FIG. 1, in a starting body of an object to be processed 10, an underlayer 14, a soft magnetic layer 16, a seed layer 18, a continuous recording layer 20, a first mask layer 22, a second mask layer 24, and a resist layer 26 are formed over a glass substrate 12 in this order.

The underlayer 14 having a thickness of 30 to 200 nm is made of Ta (tantalum), Cr (chromium), or a Cr alloy. The soft magnetic layer 16 having a thickness of 50 to 300 nm is made of an Fe (iron) alloy, or a Co (cobalt) alloy. The seed layer 18 having a thickness of 3 to 30 nm is made of Cr, or a non-magnetic material such as a CoCr alloy, Ti (titanium), and MgO (magnesium oxide). The continuous recording layer 20 having a thickness of 5 to 30 nm is made of a CoCr (cobalt-chromium) alloy. The first mask layer 22 having a thickness of 3 to 50 nm is made of TiN (titanium nitride).

The second mask layer 24 having a thickness of 3 to 30 nm is made of Ni (nickel). The resist layer 26 having a thickness of 30 to 300 nm is made of a negative type resist (NBE22A made by Sumitomo Chemical Co., Ltd).

As shown in FIG. 2, a magnetic recording medium 30 is a perpendicular recording type of discrete track magnetic disc. The continuous recording layer 20 is divided into a number of recording elements 32A at minute intervals, so that a recording layer 32 is formed in a concavo-convex pattern. To be more specific, the recording elements 32A are concentrically formed in a radial direction of a track at the minute intervals in a data region, and are formed by a pattern of predetermined servo information or the like in a servo region. Concave portions 34 between the recording elements 32A are filled with a non-magnetic material 36. A protection layer 38 and a lubricating layer 40 are formed over the recording elements 32A and the non-magnetic material 36, in this order.

The non-magnetic material 36 is made of SiO₂ (silicon dioxide) The protection layer 38 having a thickness of 1 to 5 nm is made of a film of hard carbon called diamond-like carbon. The term "diamond-like carbon (hereinafter called "DLC") used herein means a material which is mainly composed of carbon, has an amorphous structure, and has a hardness of approximately 200 to 8000 kgf/mm² measured by Vickers hardness testing. The lubricating layer 40 having a thickness of 1 to 2 nm is made of PFPE (perfluoropolyether).

Figure 3:
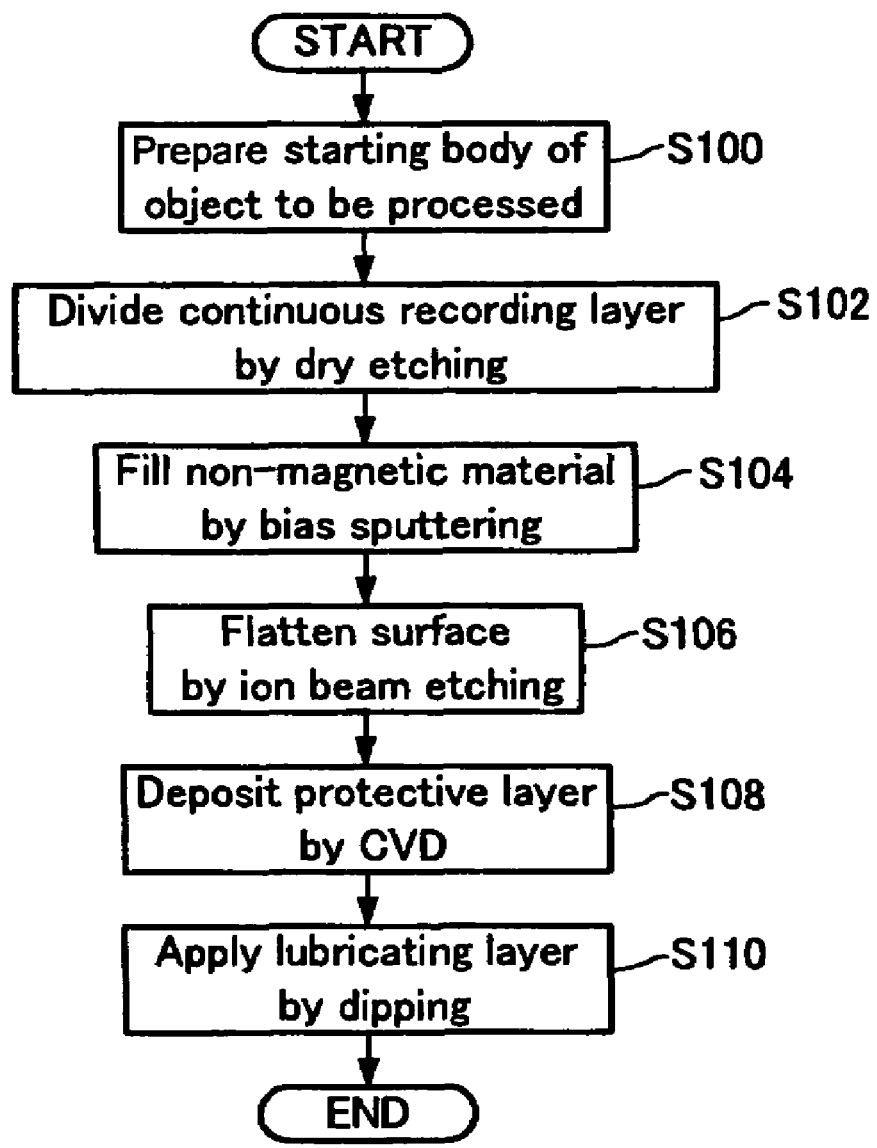
FIG. 3 is a flowchart showing an overview of a manufacturing process of the magnetic recording medium.

Next, a method for processing the object to be processed 10 will be described with reference to a flowchart of FIG. 3.

First, the starting body of the object to be processed 10 shown in FIG. 1 is processed, and the continuous recording layer 20 is divided into the recording elements 32A to form the recording layer 32.

Specifically, the starting body of the object to be processed 10 can be obtained by forming the underlayer 14, the soft magnetic material 16, the seed layer 18, the continuous recording layer 20, the first mask layer 22, and the second mask layer 24 over the glass substrate 12 in this order by sputtering, and then applying a material for the resist layer 26 by spin coating. Alternatively, the resist layer 26 may be formed by dipping.

A predetermined concavo-convex pattern is transferred on the resist layer 26 of the starting body of the object to be processed 10 by nanoimprinting using a transfer device (not illustrated). Specifically the predetermined servo pattern including contact holes is transferred to the servo region, and the concavo-convex pattern at minute intervals in the radial direction is transferred to the data region Then, the resist layer 26 in the bottom of the concave portions of the concavo-convex pattern is removed by reactive ion etching using an O₂ gas as a reactive gas. Alternatively, the resist layer 26 may be processed into the concavo-convex pattern by exposure and development.

Figure 4:
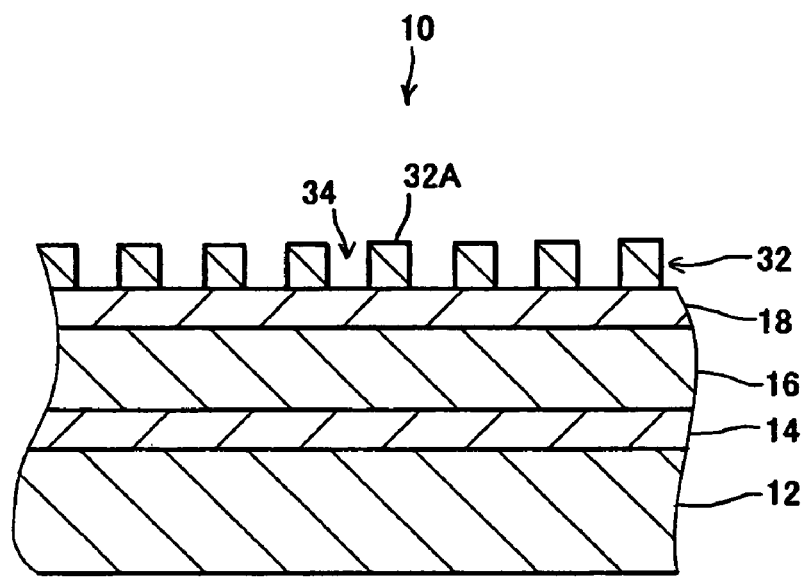
FIG. 4 is a schematic cross-sectional side view showing the shape of the object to be processed, on the surface of which recording elements are formed.

Then, the second mask layer 24 at the bottom of the concave portions is removed by ion beam etching using Ar (argon) gas, and furthermore the first mask layer 22 at the bottom of the concave portions is removed by reactive ion etching using SF₆ (sulfur hexafluoride) gas. Thus, the continuous recording layer 20 is exposed in the bottom of the concave portions. Then, the continuous recording layer 20 at the bottom of the concave portions is removed by reactive ion etching using CO gas and NH₃ gas as a reactive gas. Accordingly, the continuous recording layer 20 is divided into a number of recording elements 32A, and the recording layer 32 is formed (S102). Then, the first mask layer 22 remaining on the top faces of the recording elements 32A is completely removed by reactive ion etching using SF₆ gas as a reactive gas, and hence the object to be processed 10 as shown in FIG. 4, in which the recording layer 32 in the concavo-convex pattern is formed in its surface, is obtained.

Figure 5:
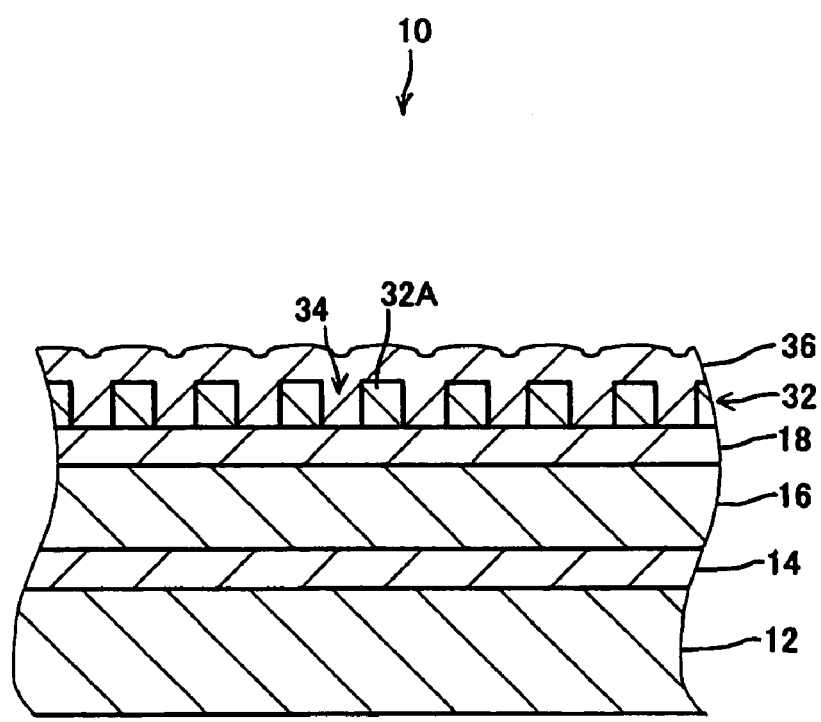
FIG. 5 is a schematic cross-sectional side view showing the shape of the object to be processed, in which a non-magnetic material is deposited over the recording elements and concave portions are filled with the non-magnetic material.

Then, as shown in FIG. 5, particles of SiO₂ (non-magnetic material 36) are deposited on the surface of the object to be processed 10 by bias sputtering with applying bias power to the object to be processed 10, in order to fill the concave portions 34 between the recording elements 32A with the non-magnetic material 36 (S104). The non-magnetic material 36 is deposited so as to completely cover the recording elements 32A.

At this time, since a sputtering gas such as Ar collides with a target of SiO₂, the particles of SiO₂ scatter and tend to be equally deposited on the surface of the object to be processed 10 in accordance with the concavo-convex shape of the recording elements 32A. Therefore, the surface of the non-magnetic material 36 tends to have a concavo-convex shape.

By applying the bias power to the object to be processed 10, on the other hand, the sputtering gas biased in the direction of the object to be processed 10 collides with the deposited SiO₂, and etches a part of the deposited SiO₂. This etching operation tends to selectively remove a protruding portion of the deposited SiO₂ quicker than the other portions thereof, so that concavo-convex in the surface of the non-magnetic material 36 is gradually flattened. These functions advance at the same time in actual fact. Since a deposit function exceeds an etching function, the deposit of the non-magnetic material 36 advances while restraining the concavo-convex formation in the surface.

Accordingly, as shown in FIG. 5, the non-magnetic material 36 is deposited into the shape of the restrained concavo-convex in the surface.

Figure 6:
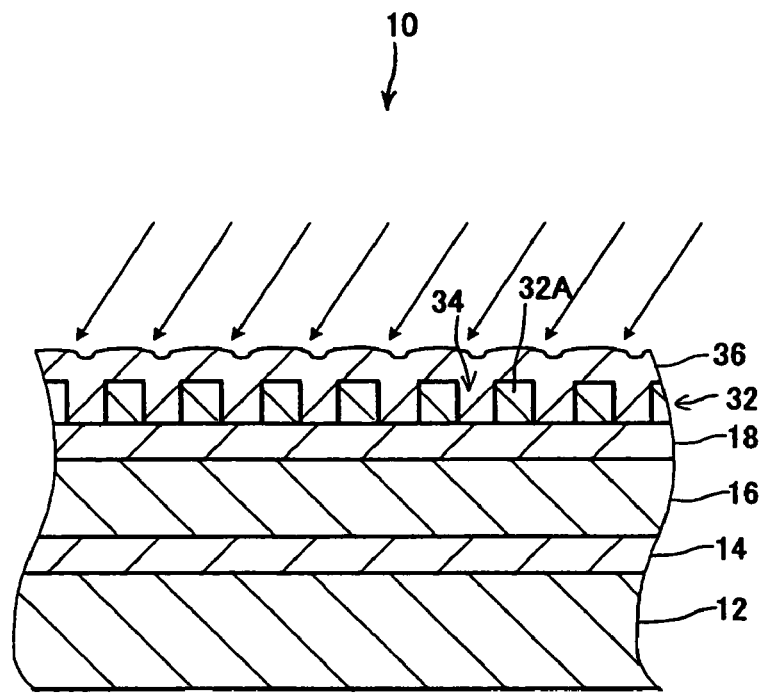
FIG. 6 is a schematic cross-sectional side view showing a flattening step of the object to be processed.

Then, as shown in FIG. 6, the excess part of the non-magnetic material 36 is removed up to the top faces of the recording elements 32A by use of ion beam etching, to flatten the surfaces of the recording elements 32A and the non-magnetic material 36 (S106). At this time, Ar gas is used as a processing gas of the ion beam etching, and the incident angle of an ion beam is restricted within the range between or equal to 50 and 60 degrees, to remove the non-magnetic material 36 up to the top faces of the recording elements 32A. Inclining the incident direction of the ion beam with respect to a direction orthogonal to the surface, as described above, makes it possible to increase the effect of flattening the concavo-convex shape.

Figure 7:
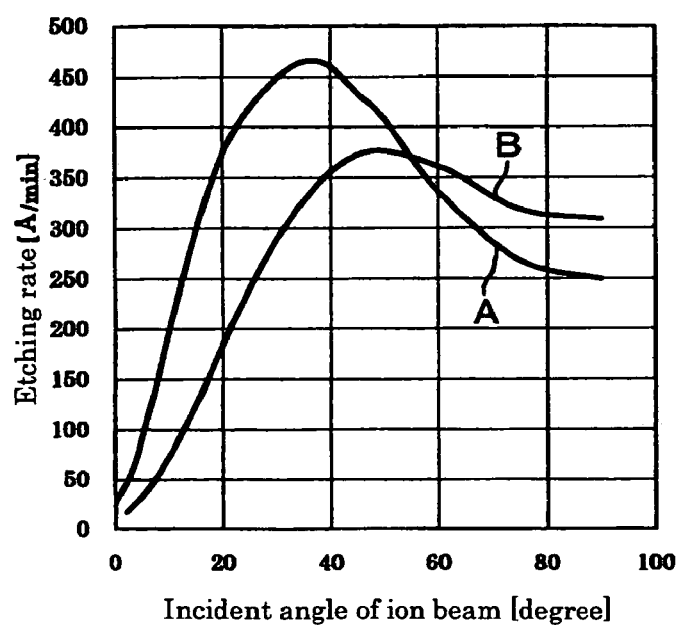
FIG. 7 is a graph which shows the relation between the incident angle of an ion beam and an etching rate when Ar gas is used as a processing gas in the flattening step.

Furthermore, as shown in FIG. 7, by restricting the incident angle of the ion beam within the foregoing range, the etching rate of the SiO₂ (non-magnetic material 36) represented by a curve A in the drawing becomes substantially equal to the etching rate of the CoCr alloy (recording layer 32) represented by a curve B in the drawing. Accordingly, if a part of recording element 32A is removed together with the non-magnetic material 36 after the non-magnetic material 36 above the recording elements 32A is removed, difference in the height between the top face of the recording element 32A and the top face of the non-magnetic material 36 does not increase. FIG. 7 shows the etching rate of SiO₂ when the gas pressure of the sputtering gas during deposition is adjusted at 0.3 Pa.

Figure 8:
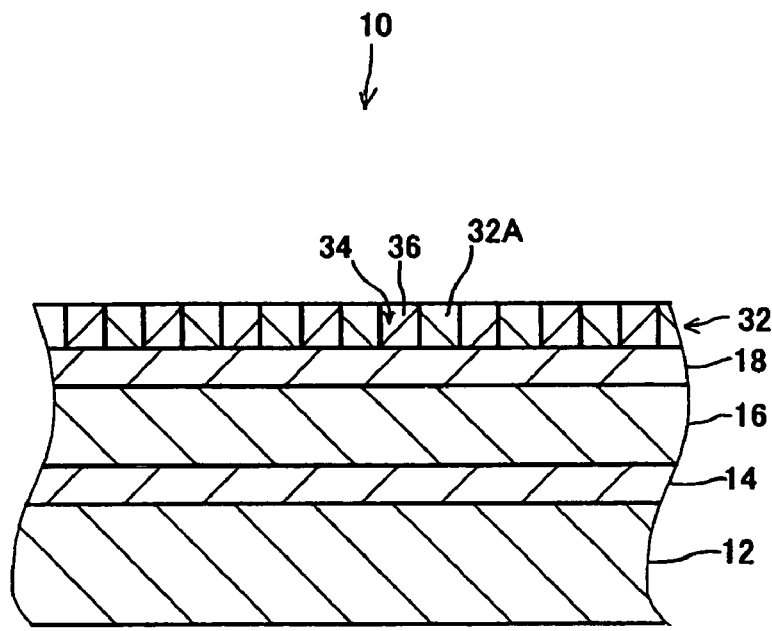
FIG. 8 is a schematic cross-sectional side view showing the shape of the processed object to be processed after the flattening step.

Therefore, as shown in FIG. 8, it is possible to completely remove the non-magnetic material 36 above the recording elements 32A, and sufficiently flatten the top faces of the non-magnetic material 36 and the recording elements 32A.

Since the bias power is applied in a non-magnetic material filling step (S104), the non-magnetic material 36 is deposited in such a manner as to restrain the concavo-convex formation in its surface. Therefore, it is easy to flatten the surface.

Then, the protection layer 38 is formed on the top faces of the recording elements 32A and the non-magnetic material 36 by a CVD (chemical vapor deposition) method (S108). Furthermore, a material of the lubricating layer 40 is applied on the protection layer 38 by dipping (S110). Thus, the magnetic recording medium 30 as shown in FIG. 2 is completed.

As described above, applying the bias power makes it possible to deposit the non-magnetic material 36 while restraining the concavo-convex formation in the surface. Furthermore, since the incident angle of the ion beam is restricted so as to substantially equalize the etching rate of the recording elements 32A with that of the non-magnetic material 36, it is possible to certainly flatten the surfaces of the recording elements 32A and non-magnetic material 36 to a desired level by use of the ion beam etching. Thus, the surface of the lubricating layer 40 becomes sufficiently flat to a desired level. Therefore, it is possible to obtain the stable flying characteristics of a head slider.

In the first exemplary embodiment, the non-magnetic material 36 is deposited by the sputtering. The non-magnetic material 36, however, may be deposited by another deposition method such as, for example, ion beam deposition. Also in this case, it is possible to obtain the effect of restraining the concavo-convex formation in the surface by applying the bias power. The non-magnetic material 36, on the other hand, may be deposited by a deposition method without applying the bias power, as long as the surface is sufficiently flattened in a flattening step (S106).

In the first exemplary embodiment, Ar gas is used as the processing gas of the ion beam etching. For example, an inert gas such as Kr (krypton) and Xe (xenon), or a halogen-containing gas such as $C_2F_6$ (ethane hexafluoride), $SF_6$ (sulfur hexafluoride), and $CF_4$ (carbon tetrafluoride) maybe used as the processing gas instead. Chlorine-containing gas is available as the halogen-containing gas in addition to a fluorine-containing gas, but it is preferable to use the fluorine-containing gas because the remaining processing gas is easily cleaned.

In the first exemplary embodiment, the incident angle of the ion beam is restricted within the range between or equal to 50 and 60 degrees. The incident angle of the ion beam is properly adjusted in accordance with a type of processing gas and the materials of the recording layer 32 and the non-magnetic material 36, in such a manner as to substantially equalize the etching rate of the recording layer 32 with that of the non-magnetic material 36.

Next, a second exemplary embodiment of the present invention will be described.

In the second exemplary embodiment, as compared with the foregoing first exemplary embodiment, a gas mixture of Ar gas and $C_2F_6$ (ethane hexafluoride) gas is used as a processing gas for ion beam etching in a flattening step (S106), and the incident angle of an ion beam is set at approximately 90 degrees. Also, the ratio of the flow of Ar gas in the processing gas is restricted within the range between or equal to 80% and 90%. The other conditions are the same as those of the foregoing first exemplary embodiment, so that the description thereof will be omitted.

Figure 9:
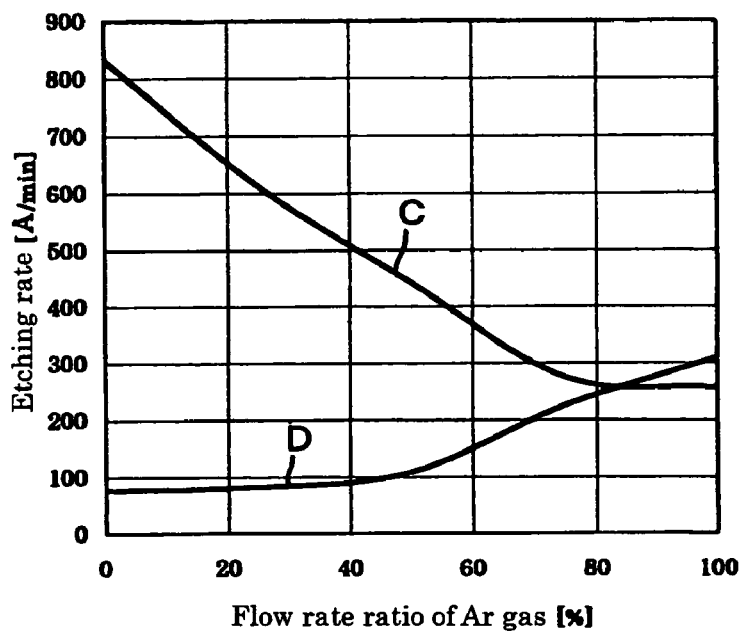
FIG. 9 is a graph which shows the relation between the ratio of Ar gas in a processing gas and an etching rate when a gas mixture of Ar gas and $C_2F_6$ gas is used as the processing gas according to a second exemplary embodiment of the present invention.

Referring to FIG. 9, a curve C shows the etching rate of $SiO_2$ (non-magnetic material 36) and a curve D shows the etching rate of a CoCr alloy (recording layer 32), with respect to the ratio of the flow of the Ar gas in the processing gas.

Furthermore, as shown in FIG. 9, restricting the ratio of the flow of the Ar gas in the processing gas within the foregoing range makes it possible to substantially equalize the etching rate of the non-magnetic material 36 with the etching rate of the recording layer 32. Accordingly, if a part of the recording element 32A is removed together with the non-magnetic material 36 after the non-magnetic material 36 above the recording elements 32A is removed, difference in the height between the top face of the recording element 32A and the top face of the non-magnetic material 36 does not increase.

A protection layer 38 and a lubricating layer 40 are formed after that, as in the case of the foregoing first exemplary embodiment, so that a magnetic recording medium 30 is completed.

In the second exemplary embodiment, the gas mixture of Ar gas and $C_2F_6$ gas is used as the processing gas. A gas mixture of another halogen-containing gas such as $SF_6$ and $CF_4$ and an inert gas such as Ar, Kr, and Xe may be used as the processing gas instead. The processing gas may be composed of three or more types of gas.

In the second exemplary embodiment, the incident angle of the ion beam is set at approximately 90 degrees. The incident angle of the ion beam, however, is properly adjustable in accordance with a type of processing gas and the materials of the recording layer 32 and the non-magnetic material 36, so as to substantially equalize the etching rate of the recording layer 32 with that of the non-magnetic material 36.

In the second exemplary embodiment, the ratio of the flow of the Ar gas in the processing gas is restricted within the range between or equal to 80% and 90%. The component ratio of gas in the processing gas, however, is properly adjustable in accordance with the type of processing gas, the materials of the recording layer 32 and the non-magnetic material 36, and the incident angle of the ion beam, so as to substantially equalize the etching rate of the recording layer 32 with that of the non-magnetic material 36.

Next, a third exemplary embodiment of the present invention will be described.

Figure 10:
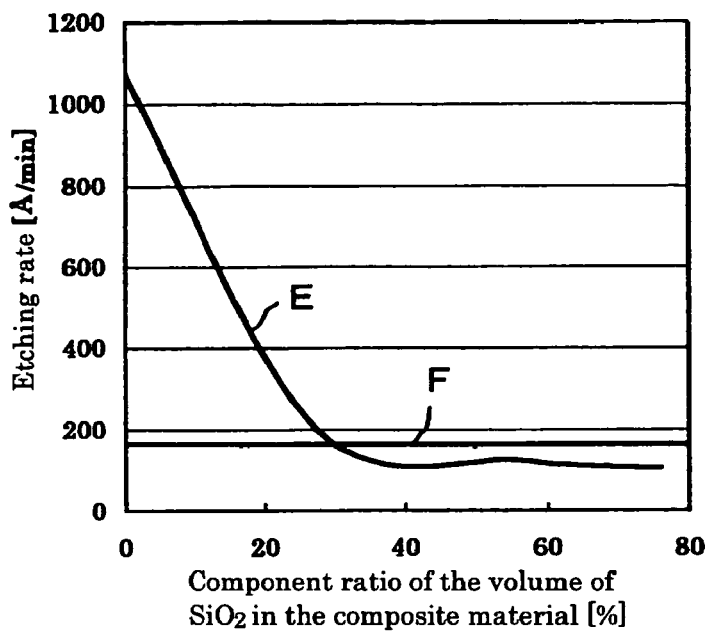
FIG. 10 is a graph which shows the relation between the ratio of $SiO_2$ in a composite material and an etching rate according to a third exemplary embodiment of the present invention.

In the third exemplary embodiment, as compared with the foregoing first exemplary embodiment, reactive ion etching is carried out in a flattening step (S106) by using CO (carbon monoxide) gas and $NH_3$ (ammonia) gas as a reactive gas. A non-magnetic material 36 is made of a composite material of $SiO_2$ and C (carbon). In the reactive ion etching using CO gas and $NH_3$ gas as the reactive gas, the etching rate of $SiO_2$ is different from that of carbon. Also, the component ratio of the volume of $SiO_2$ in the composite material is restricted between or equal to 25% and 35%. The other conditions are the same as those of the foregoing first exemplary embodiment, so that the description thereof will be omitted. Referring to FIG. 10, a curve E shows the average etching rate of the composite material of $SiO_2$ and C (non-magnetic material 36), with respect to the component ratio of the volume of $SiO_2$ in the composite material. A line F in FIG. 10 shows the etching rate of a CoCr alloy (recording layer 32) under the same processing conditions.

In the case of the reactive ion etching using CO gas and $NH_3$ gas as the reactive gas, as described above, the reactive gas chemically reacts with carbon to make the carbon brittle, and hence the etching rate is increased. Therefore, it is possible to increase the etching rate of the non-magnetic material 36 so as to substantially equalize it with the etching rate of the recording layer 32.

As shown in FIG. 10, restricting the component ratio of the volume of $SiO_2$ in the composite material within the foregoing range makes it possible to substantially equalize the etching rate of the non-magnetic material 36 with that of the recording layer 32. Therefore, if a part of the recording element 32A is removed together with the non-magnetic material 36 after the non-magnetic material 36 above the recording element 32A is removed, difference in the height between the top face of the recording element 32A and the top face of the non-magnetic material 36 does not increase.

A protection layer 38 and a lubricating layer 40 are formed after that, as in the case of the foregoing first exemplary embodiment, so that a magnetic recording medium 30 is completed.

In the third exemplary embodiment, the non-magnetic material 36 is made of the composite material of $SiO_2$ and C (carbon). In the reactive ion etching using CO gas and NH$_3$ gas as the reactive gas, the etching rate of SiO$_2$ is different from that of carbon. It is possible, however, to use a composite material including other non-magnetic materials instead, as long as the etching rates of the non-magnetic materials in a flattening step (S106) are different from each other. A composite material may be composed of three or more types of non-magnetic materials.

In the third exemplary embodiment, the component ratio of the volume of SiO$_2$ in the composite material is restricted in the range between or equal to approximately 25% and 35%. The component ratio of the non-magnetic material in the composite material may be properly adjusted in accordance with a type of processing gas and the materials of the recording layer 32 and the non-magnetic material 36, so as to substantially equalize the etching rate of the recording layer 32 with that of the non-magnetic material 36.

The third exemplary embodiment uses the reactive ion etching which uses CO gas and NH$_3$ gas as the reactive gas in the flattening step (S106). Reactive ion etching or reactive ion beam etching which uses a halogen-containing gas such as C$_2$F$_6$, SF$_6$, and CF$_4$ as a reactive gas, however, may be used instead in accordance with the materials of the recording layer 32 and the non-magnetic material 36.

Next, a fourth exemplary embodiment of the present invention will be described.

Figure 11:
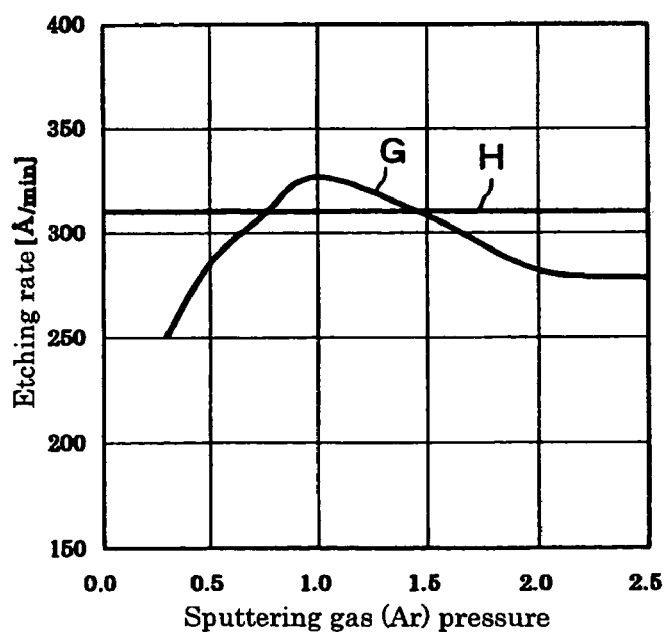
FIG. 11 is a graph which shows the relation between gas pressure in depositing a non-magnetic material and an etching rate according to a fourth exemplary embodiment of the present invention.

In the fourth exemplary embodiment, as compared with the foregoing first exemplary embodiment, the incident angle of an ion beam in a flattening step (S106) is set at approximately 90 degrees. Also, the gas pressure of a sputtering gas is restricted within a range from 0.7 to 0.8 Pa, or a range from 1.4 to 1.5 Pa as a deposit condition in a non-magnetic material filling step (S104). The other conditions are the same as those of the foregoing first exemplary embodiment, the description thereof will be omitted. Referring to FIG. 11, a curve G shows the etching rate of SiO$_2$ (non-magnetic material 36) with respect to the gas pressure of the sputtering gas during deposition, when the incident angle of the ion beam is 90 degrees. A line H in FIG. 11 shows the etching rate of a CoCr alloy (recording layer 32) under the same processing conditions.

If the incident angle of the ion beam is set at approximately 90 degrees, restricting the gas pressure of the sputtering gas within the range from 0.7 to 0.8 Pa or from 1.4 to 1.5 Pa makes it possible to substantially equalize the etching rate of the non-magnetic material 36 with that of the recording layer 32, as shown in FIG. 11. Accordingly, if a part of the recording element 32A is removed together with the non-magnetic material 36 after the non-magnetic material 36 above the recording element 32A is removed, difference in the height between the top face of the recording element 32A and the top face of the non-magnetic material 36 does not increase.

A protection layer 38 and a lubricating layer 40 are formed after that as in the case of the first exemplary embodiment, so that a magnetic recording medium 30 is completed.

In the fourth exemplary embodiment, the incident angle of the ion beam is set at approximately 90 degrees. The incident angle of the ion beam, however, is properly adjustable in accordance with a type of processing gas and the materials and deposit conditions of the recording layer 32 and the non-magnetic material 36, so as to substantially equalize the etching rate of the recording layer 32 with that of the non-magnetic material 36.

The fourth exemplary embodiment uses the ion beam etching which uses Ar gas as the processing gas in the flattening step (S106). Ion beam etching using another gas as the processing gas or another dry etching method, however, may be used in the flattening step (S106).

In the fourth exemplary embodiment, the gas pressure of the sputtering gas is adjusted as the deposit condition of the non-magnetic material 36. However, another deposit condition such as, for example, a type of sputtering gas and the like may be adjusted instead to substantially equalize the etching rate of the recording layer 32 with that of the non-magnetic material 36 in the flattening step (S106).

In the foregoing first to fourth exemplary embodiments, the first mask layer 22, the second mask layer 24, and the resist layer 26 are formed over the continuous recording layer 20, and the continuous recording layer 20 is divided by three steps of dry etching. The materials, number of layers, and thickness of the resist layer and mask layers, a type of dry etching, and the like are not especially limited as long as the continuous recording layer 20 is processed into a desired concavo-convex pattern.

In the foregoing first to fourth exemplary embodiments, the recording layer 32 (continuous recording layer 20) is made of a CoCr alloy. The present invention, however, is applicable to the processing of a magnetic recording medium which is composed of recording elements made of another material such as, for example, another alloy including iron group elements (Co, Fe (iron), and Ni) and a layered product thereof.

In the foregoing first to fourth exemplary embodiments, the non-magnetic material 36 is made of SiO$_2$. The non-magnetic material, however, may be made of another oxide, another nitride such as TiN (titanium nitride), or another non-magnetic material such as Ta (tantalum), TaSi, and Si.

In the foregoing first to fourth exemplary embodiments, the underlayer 14, the soft magnetic layer 16, and the seed layer 18 are formed under the continuous recording layer 20. The structure of layers under the continuous recording layer 20 is properly changeable in accordance with a type of magnetic recording medium. For example, one or two layers of the underlayer 14, the soft magnetic layer 16, and the seed layer 18 may be omitted. Alternatively, each layer may be composed of a plurality of layers. Alternatively, the continuous recording layer may be directly formed on the substrate.

In the foregoing first to fourth exemplary embodiments, the magnetic recording medium 30 is a perpendicular recording type discrete track magnetic disc, in which the recording elements 32A are arranged in parallel in the radial direction of the track at minute intervals in the data region. The present invention, as a matter of course, is applicable to manufacturing a magnetic disc in which recording elements are arranged side by side in a peripheral direction of a track (in the direction of a sector) at minute intervals, a magnetic disc in which recording elements are arranged side by side in both of a radial direction and a peripheral direction of a track at minute intervals, a PERM (pre-embossed recording medium) type of magnetic disc having a continuous recording layer formed into a concavo-convex pattern, and a magnetic disc in which a track is formed into a spiral shape. The present invention is applicable to a longitudinal recording type magnetic disc. The present invention is also applicable to manufacturing a magneto-optical disc such as an MO, a thermal assisted type of magnetic disc using both of magnetism and heat, and another magnetic recording medium in a shape other than a disc such as a magnetic tape which has a recording layer in a concavo-convex pattern.

WORKING EXAMPLE 1

The magnetic recording medium 30 was manufactured in a way of the foregoing first exemplary embodiment. To be more specific, the recording layer 32 was formed into the following concavo-convex pattern.

Pitch: 150 nm
Width of convex portion: 95 nm
Width of concave portion: 55 nm
Difference in the height between concave and convex portions: 20 nm Then, the non-magnetic material 36 was deposited to a thickness of approximately 40 nm in the non-magnetic material filling step (S104) under the following conditions, to fill the concave portions 34 with the non-magnetic material 36. The thickness of the non-magnetic material described above is the distance between the most projecting portion in the surface of the deposited non-magnetic material 36 and the top face of the recording layer 32.

Input power: 500 W
Ar gas pressure: 0.3 Pa
Bias power: 250 W

Then, the non-magnetic material 36 above the recording elements 32A was completely removed in the flattening step (S106) under the following conditions. At this time, a part of the recording layer was slightly etched within the range of variations. Both of the etching rates of the non-magnetic material 36 ($SiO_2$) and the recording element 32A under these processing conditions are approximately 370 angstroms/min.

Quantity of flow of Ar gas: 11 sccm
Gas pressure: 0.05 Pa
Beam voltage: 500V
Beam current: 500 mA
Suppressor voltage: 400V
Incident angle of ion beam: +55 degrees After the flattening step (S106), the surfaces of the recording layer 32 and the non-magnetic material 36 were observed by an AFM (atomic force microscope), and obtained the following results. The following average difference in height refers to the average difference in the height between the top face of the recording element 32A and the top face of the non-magnetic material 36.

Arithmetic mean roughness Ra: 0.41 nm
Maximum height Rmax: 4.02 nm
Average difference in height: 0.0 nm

WORKING EXAMPLE 2

As is described in the foregoing second exemplary embodiment, the gas mixture of Ar gas and $C_2F_6$ (ethane hexafluoride) was used as the processing gas for the ion beam etching in the flattening step (S106). The other conditions were same as those of the working example 1. Conditions in the flattening step (S106) were set as follows. Both of the etching rates of the non-magnetic material 36 ($SiO_2$) and the recording element 32A are approximately 260 angstroms/min under the processing conditions according to the working example 2.

Quantity of flow of Ar+$C_2F_6$ gas: 11 sccm
Ratio of flow of Ar gas in processing gas: approximately 83%
Gas pressure: 0.05 Pa
Beam voltage: 500V
Beam current: 500 mA
Suppressor voltage: 400V
Incident angle of ion beam: +90 degrees After the flattening step (S106), the surfaces of the recording layer 32 and the non-magnetic material 36 were observed by the AFM, and obtained the following results.

Arithmetic mean roughness Ra: 0.46 nm
Maximum height Rmax: 4.19 nm
Average difference in height: 0.0 nm

COMPARATIVE EXAMPLE 1

As compared with the foregoing working example 1, the incident angle of the ion beam was set at approximately 90 degrees. The other conditions were same as those of the working example 1. In processing conditions according to this comparative example 1, the etching rate of the non-magnetic material 36 is approximately 250 angstroms/min, and the etching rate of the recording layer 32 is approximately 310 angstroms/min.

After the flattening step (S106), the surfaces of the recording layer 32 and the non-magnetic material 36 were observed by the AFM, and obtained the following results.

Arithmetic mean roughness Ra: 0.67 nm
Maximum height Rmax: 6.65 nm
Average difference in height: 1.2 nm The working examples 1 and 2, in which the etching rates of the recording layer 32 and the non-magnetic material 36 were equalized, were superior to the comparative example 1, in which the etching rates of the recording layer 32 and the non-magnetic material 36 were different, in terms of the flatness of the surface.

WORKING EXAMPLE 3

As is described in the foregoing third exemplary embodiment, the reactive ion etching which used CO gas and $NH_3$ gas as the reactive gas was used in the flattening step (S106), and also the non-magnetic material 36 was made of the composite material of $SiO_2$ and C. The component ratio of the volume of $SiO_2$ in the composite material was approximately 30%. The other steps were the same as those of the working example 1. Conditions in the flattening step (S106) were set as follows. In the processing conditions according to this working example 3, both of the etching rates of the non-magnetic material 36 ($SiO_2$+C) and the recording element 32A are approximately 160 angstroms/min.

Quantity of flow of CO+$NH_3$ gas: 100 sccm
Ratio of flow of CO gas in reactive gas: approximately 12.5%
Gas pressure: 1.0 Pa
Input power: 1000 W
Substrate bias power: 5.7 W/cm$^2$ After the flattening step (S106), the surfaces of the recording layer 32 and the non-magnetic material 36 were observed by the AFM, and obtained the following results.

Arithmetic mean roughness Ra: 0.48 nm
Maximum height Rmax: 4.68 nm
Average difference in height: 0.0 nm

WORKING EXAMPLE 4

As is described in the foregoing fourth exemplary embodiment, the incident angle of the ion beam in the flattening step (S106) was set at approximately 90 degrees, and the gas pressure of the sputtering gas was set at 0.75 Pa as a deposit condition in the non-magnetic material charging process (S104). The other steps were same as those of the working example 1. According to this working example 4, both of the etching rates of the non-magnetic material 36 (SiO$_2$) and the recording element 32A are approximately 310 angstroms/min.

After the flattening step (S106), the surfaces of the recording layer 32 and the non-magnetic material 36 were observed by the AFM, and obtained the following results.

Arithmetic mean roughness Ra: 0.59 nm
Maximum height Rmax: 5.11 nm
Average difference in height: 0.0 nm According to any of the working examples 1 to 4, the non-magnetic material 36 above the recording layer 32 was completely removed, and even the recording layer 32 was slightly etched. However, as described above, it was possible to sufficiently flatten the surface of the magnetic recording medium.

The present invention is applicable to manufacturing a magnetic recording medium such as, for example, a discrete track medium and a patterned medium in which a recording layer is formed in a concavo-convex pattern.

What is claimed is:

1. A method for manufacturing a magnetic recording medium comprising:

a non-magnetic material filling step of depositing a non-magnetic material over a recording layer formed in a predetermined concavo-convex pattern over a substrate to fill a concave portion of the concavo-convex pattern with the non-magnetic material; and a flattening step of removing an excess part of the non-magnetic material above the recording layer so that the non-magnetic material remains in the concave portion by dry etching to flatten surfaces of the recording layer and the non-magnetic material, wherein a processing condition is set so as to substantially equalize an etching rate of the non-magnetic material with an etching rate of the recording layer, with respect to the dry etching in the flattening step;

a composite material including a plurality of types of materials with different etching rates with respect to the dry etching is used as the non-magnetic material; and a component ratio of a material included in the composite material is restricted within a predetermined range as the setting of the processing condition.

2. The method for manufacturing a magnetic recording medium according to claim 1, wherein the non-magnetic material is deposited with applying bias power to the substrate in the non-magnetic material filling step.

* * * * *